(12) United States Patent
Bhaskaran

(10) Patent No.: US 11,870,955 B2
(45) Date of Patent: Jan. 9, 2024

(54) RECIPIENT PROFILE-BASED GENERATION OF SCAN IMAGES

(71) Applicant: Hewlett-Packard Development Company, L.P., Spring, TX (US)

(72) Inventor: Shinoj Bhaskaran, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/029,440

(22) PCT Filed: Jun. 9, 2021

(86) PCT No.: PCT/US2021/070686
§ 371 (c)(1),
(2) Date: Mar. 30, 2023

(87) PCT Pub. No.: WO2022/076955
PCT Pub. Date: Apr. 14, 2022

(65) Prior Publication Data
US 2023/0370552 A1   Nov. 16, 2023

(30) Foreign Application Priority Data
Oct. 9, 2020 (IN) .............................. 202041044080

(51) Int. Cl.
*H04N 1/00* (2006.01)
(52) U.S. Cl.
CPC ................................ *H04N 1/00225* (2013.01)
(58) Field of Classification Search
None
See application file for complete search history.

(56) References Cited

U.S. PATENT DOCUMENTS

| 7,058,586 B1* | 6/2006 | Law ....................... G06Q 10/02 705/5 |
| 7,492,473 B2* | 2/2009 | Ferlitsch ............ H04N 1/33307 358/1.15 |
| 7,953,786 B2* | 5/2011 | Bassom ................ H04L 51/066 709/201 |

(Continued)

FOREIGN PATENT DOCUMENTS

WO  2018/057097 A1  3/2018

*Primary Examiner* — Andrew H Lam
(74) *Attorney, Agent, or Firm* — Brooks, Cameron & Huebsch, PLLC

(57) ABSTRACT

An example image forming apparatus may include a scanner module to scan a document to be sent to a recipient and store electronic raw data representing the document. Further, the image forming apparatus may include a controller to receive a destination address as an input to perform a user-selectable scanning feature. The controller may retrieve a first user profile and a second user profile associated with the destination address from a database. The first user profile and the second user profile may include first setting information and second setting information, respectively. The controller may process the electronic raw data to generate a scan image in accordance with the first user profile. The first user profile may be selected based on a characteristic of the electronic raw data. The controller may transmit the scan image to the destination address in accordance with the user-selectable scanning feature.

15 Claims, 11 Drawing Sheets

(56) References Cited

U.S. PATENT DOCUMENTS

| | | | | |
|---|---|---|---|---|
| 8,045,203 | B2* | 10/2011 | Henry | H04N 1/0022 358/440 |
| 8,085,423 | B2* | 12/2011 | Dowling | H04L 63/0272 379/349 |
| 2004/0042034 | A1* | 3/2004 | Tiffan | H04N 1/32037 358/1.15 |
| 2006/0072144 | A1* | 4/2006 | Dowling | G06F 21/606 358/1.15 |
| 2007/0223051 | A1 | 9/2007 | Henry et al. | |
| 2008/0117473 | A1 | 5/2008 | Juliano | |
| 2015/0103383 | A1* | 4/2015 | Dowling | H04N 1/00225 358/402 |

* cited by examiner

FIG. 4

UNTITLED – MESSAGE (HTML)

| FILE | MESSAGE | INSERT | FORMAT TEXT | HELP |

REPLY

FROM  PRINTER123@PRINT.COM ~404
TO    USER1@ABC.COM ~402
SUBJECT  SCANNED DOCUMENT

~406

PLEASE FIND THE ATTACHED SCANNED IMAGE IN ACCORDANCE WITH A FIRST USER PROFILE INCLUDING BELOW SETTING INFORMATION

TYPE = BLACK & WHITE    RESOLUTION DPI = 200   ~408

FURTHER, IF REQUIRED, PLEASE SELECT ONE OF THE BELOW USER PROFILES  ~410

☐ SECOND USER PROFILE
  TYPE = COLOR    RESOLUTION DPI = 600   ~412

☐ THIRD USER PROFILE
  TYPE = BLACK & WHITE    RESOLUTION DPI = 1200   ~414

[SUBMIT] ~416

~400

US 11,870,955 B2

RECIPIENT PROFILE-BASED GENERATION OF SCAN IMAGES

BACKGROUND

Image forming apparatuses may be capable of performing functions such as transmitting facsimile documents, scanning documents, scan-to-email, and/or the like. An image forming apparatus may be a single function peripheral (SFP) or a multi-function peripheral (MFP). Example SFP may include a printer, a facsimile machine, a scanner, or a copier that may perform one of the functions. Example MFP can incorporate the functionality of multiple devices in one, to perform a combination of some or all of a printer, a scanner, a photocopier, a fax machine, and the like. Such image forming apparatuses may be capable of scanning a document and transmitting the scanned document to a recipient address (e.g., an email address, a fax number, or the like) based on user-defined setting information or default setting information.

BRIEF DESCRIPTION OF THE DRAWINGS

Examples are described in the following detailed description and in reference to the drawings, in which:

FIG. 4 is an example email, including an electronic form providing available user profiles to modify setting information of a scan image;

DETAILED DESCRIPTION

Figure 1A:
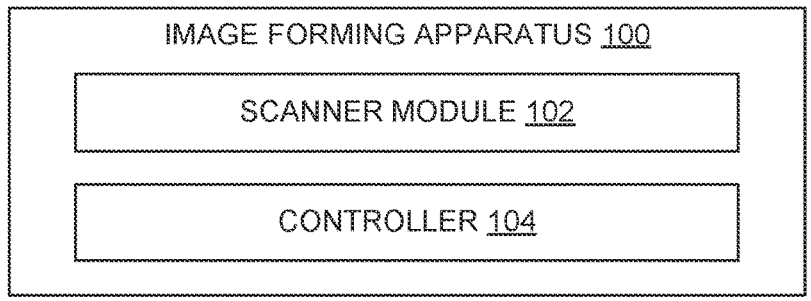
FIG. 1A is a block diagram of an example image forming apparatus, including a controller to generate a scan image in accordance with a first user profile.

An image forming apparatus can perform various scan functions, for example, a scan-to-email function (e.g., scanning a document and sending the scanned document to an email recipient via an email), a scan-to-fax function (e.g., scanning a document and transmitting the scanned document to a destination fax device), and the like. Further, the image forming apparatus may perform such functions by scanning a document and processing the scanned document in accordance with setting information. Example setting information may include format settings (e.g., format such as PDF, JPEG, TIFF, PNG, and the like), quality settings (e.g., lightness of the image, color or black/white, resolution, halftone or binary image, contour enhancement, and the like), and/or the like.

In some examples, the image forming apparatus may process the document using default setting information of the image forming apparatus. In other examples, the image forming apparatus may provide a user interface (UI) through which a user or sender can define the setting information. Further, the image forming apparatus may generate a scan image using the default or user-defined setting information and output the scan image to a recipient in accordance with a user-selected scan function.

However, upon receiving the scan image, the recipient may prefer to have the document with different setting information. For example, consider that a sender may select the setting information (e.g., PDF format and black/while) and perform a scan-to-email function from the image forming apparatus. In this example, the image forming apparatus may generate the scan image using the selected setting information and send the scan image to the recipient's email address. However, upon receiving the scan image, the recipient may prefer to have the document in different setting information (e.g., JPG format and color).

In such instances, when the sender is same as the recipient, the sender may have to select the different setting information and re-perform the scan-to-email function from the image forming apparatus to generate a modified scan image. When the sender is different from the recipient, the recipient may have to communicate the modified setting information to the sender and request the sender to re-perform the scan-to-email function with the modified setting information. In this case, the recipient may have to waft till the sender sends the modified scan image. Further, the sender may not be able to re-perform the scan-to-email function, for instance, when the original document is not available with the sender or the image forming apparatus is not accessible to the sender. In other examples, even though the sender may be aware of recipient's preferred setting information, when there are multiple recipients having distinct preferred setting information, then the sender may have to perform the scan-to-email function multiple times according to the distinct preferred setting information.

Examples described herein may provide an option for a user (e.g., a recipient) to create a set of user profiles, which can be mapped to a recipient address (e.g., an email address or a fax number) and stored in a server or in an image forming apparatus. When a user-selectable scanning feature (e.g., a scan-to-email feature or a scan-to-fax feature) is received, the image forming apparatus may scan a document to be sent to the recipient address and store electronic raw data representing the document. Further, the image forming apparatus may retrieve a first user profile (e.g., having first setting information) associated with the recipient address, process the electronic raw data to generate a scan image in accordance with the first user profile, and transmit the scan image and an option to select a second user profile to the recipient address. In one example, the first user profile can be selected based on a characteristic (e.g., a size, a type (e.g., text, image, or the like), color, black/white, or the like) of the electronic raw data. In another example, the first user profile can be selected based on a priority (e.g., a predefined priority, a priority determined based on a usage pattern, or the like).

Further, the image forming apparatus may receive a selection of the second user profile (e.g., having second setting information), process the stored electronic raw data in accordance with second user profile to generate a modified scan image, and transmit the modified scan image to the recipient address.

Thus, examples described herein may provide an option for the recipient to select another user profile to modify the setting information upon receiving a scan image. Further, once the document is scanned and the electronic raw data is stored, the recipient can obtain multiple scan outputs from the image forming apparatus by trying out various combinations of settings without re-scanning the document.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1A is a block diagram of an example image forming apparatus 100, including a controller 104 to generate a scan image in accordance with a first user profile. As shown in FIG. 1A, image forming apparatus 100 may include a scanner module 102 and controller 104 connected to scanner module 102. Example scanner module 102 may be an input device that scans a document such as a photograph, a page of text, and the like to convert the document into an electronic version.

During operation, scanner module 102 may scan the document to be sent to a recipient. Further, scanner module 102 may store electronic raw data representing the document. In an example, scanner module 102 may store the electronic raw data in an internal storage of image forming apparatus 100 or in an external storage connected to image forming apparatus 100. Further, the electronic raw data may be stored for a duration, which may be defined by an administrator or a user. The electronic raw data may be deleted after the duration. Further, the electronic raw data may be generated by image forming apparatus 100 based on maximum values of setting information. In an example, the electronic raw data may include minimally processed image data from an image sensor of scanner module 102. The purpose of the electronic raw data may be to save the image data obtained from the image sensor with minimum or no loss of information.

Further, controller 104 may receive a destination address of the recipient as an input to perform a user-selectable scanning feature. In an example, the user-selectable scanning feature can be a scan-to-email function, a scan-to-fax function, or the like. Example destination address may be an email address (e.g., corresponding to the scan-to-email function) or a fax number (e.g., corresponding to the scan-to-fax function). In an example, the stored electronic raw data may be mapped to the destination address using an identifier.

Figure 1B:
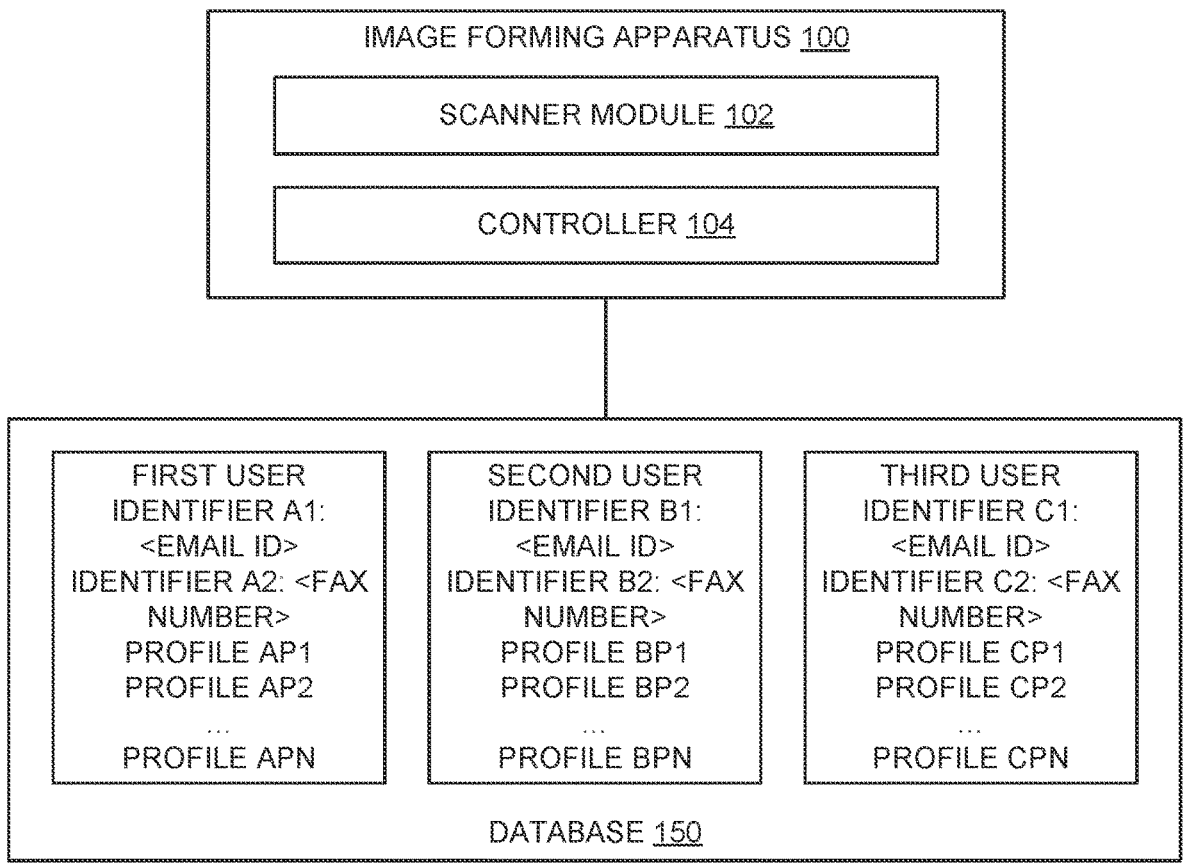
FIG. 1B is a block diagram of the example image forming apparatus of FIG. 1A, depicting additional features.

Furthermore, controller 104 may retrieve a first user profile and a second user profile associated with the destination address from a database (e.g., as shown in FIG. 1B), Example first user profile and second user profile may include first setting information and second setting information, respectively. For example, the setting information may include format settings (e.g., PDF, JPEG, TIFF, PNG, and the like), quality settings (e.g., light, color or black/white, resolution, halftone or binary image, contour enhancement, and the like), and the like. Further, the first setting information and the second setting information may be different from setting information of the electronic raw data. For example, the first setting information may include a 200 dots per inch (DPI), while the setting information of the electronic raw data may include a maximum possible DPI.

Further, controller 104 may process the electronic raw data to generate a scan image in accordance with the first user profile. In an example, the first user profile may be selected based on a characteristic of the electronic raw data. Example characteristic of the electronic raw data may include a size, a type (e.g., text, image, or the like), color or black/white, intensity, and the like. Furthermore, controller 104 may transmit the scan image to the destination address in accordance with the user-selectable scanning feature. In one example, controller 104 may transmit an email including the scan image as an attachment to the destination address when the user-selectable scanning feature is a scan-to-email function. In another example, controller 104 may transmit the scan image to a destination device associated with the destination address when the user-selectable scanning feature is a scan-to-fax function. In this example, the destination device may print the scan image on a first print medium.

As used herein, the term "image forming apparatus" may refer to a device that may encompass any apparatus that accepts a job-request and performs at least one of the following functions or tasks: print, scan, copy, and/or fax. Image forming apparatus 100 may be a single function peripheral (SFP) or a multi-function peripheral (IFP). Example image forming apparatus 100 can be a laser beam printer (e.g., using an electrophotographic method for printing), an ink jet printer (e.g., using an ink jet method for printing), or the like.

In some examples, the functionalities described herein, in relation to instructions to implement functions of controller 104 and any additional instructions described herein in relation to the storage medium, may be implemented as engines or modules including any combination of hardware and programming to implement the functionalities of the modules or engines described herein. The functions of controller 104 may also be implemented by a processor. In examples described herein, processor may include, for example, one processor or multiple processors included in a single device or distributed across multiple devices.

FIG. 1B is a block diagram of example image forming apparatus 100 of FIG. 1A, depicting additional features. Similarly named elements of FIG. 1B may be similar in function and/or structure to elements described in FIG. 1A. As shown in FIG. 1B, image forming apparatus 100 may be communicatively coupled to a database 150 via a network. Example database 150 may be a server. Example network may be a local area network (LAN), a wide area network (WAN), the Internet, a wired connection, and/or the like. In another example, database 150 may be a part of image forming apparatus 100.

In an example, database 150 may store destination addresses of multiple users (e.g., a first user, a second user, and a third user) corresponding to the user-selectable scanning feature. For example, an email identifier of the first user may be stored as identifier A1 corresponding to the scan-to-email function and a fax number of the first user may be stored as identifier A2 corresponding to the scan-to-fax function. Further, database 150 may include mapping information corresponding to each user (i.e., the first user, the second user, and the third user) and respective multiple profiles. For example, the destination addresses (e.g., identifier A1 and identifier A2) of the first user may be mapped to profiles AP1 to APN. Similarly, the destination addresses (e.g., identifier 31 and identifier 32) of the second user may be mapped to profiles BP1 to BPN, and so on. During operation, controller 104 may retrieve the profiles associated with the destination address from database 150 to process the electronic raw data as described in FIG. 1A.

Figure 2:
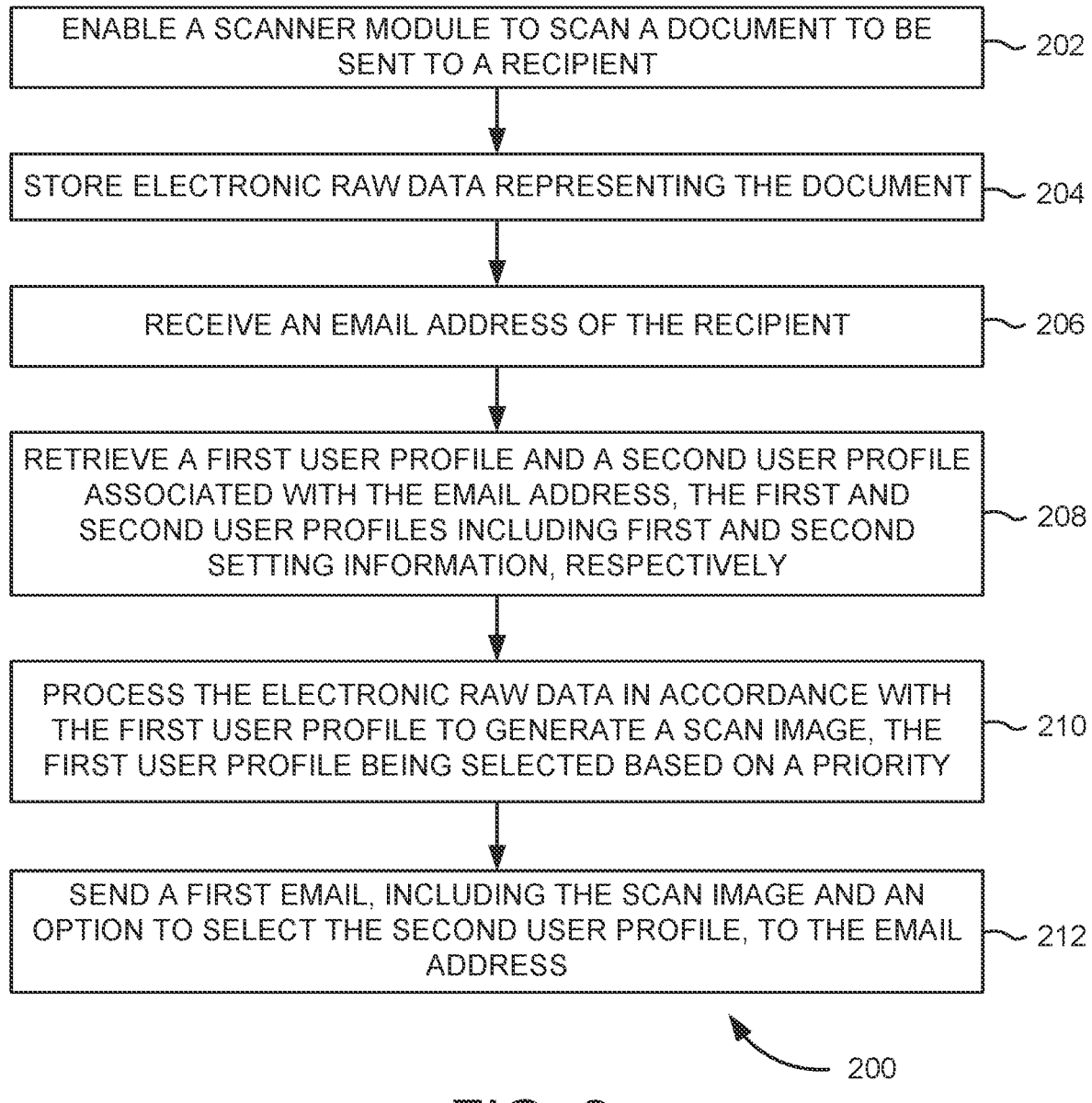
FIG. 2 is a flowchart illustrating an example method for generating a scan image in accordance with a first user profile of a recipient.

FIG. 2 is a flowchart illustrating an example method 200 for generating a scan image in accordance with a first user profile of a recipient. It should be understood that method 200 depicted in FIG. 2 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. The processes of method 200 may represent functions and/or actions performed by functionally equivalent circuits like analog circuits, digital signal processing circuits, application specific integrated circuits (ASICs), or other hardware components associated with the system. Furthermore, example method 200 may not be intended to limit the implementation of the present application, but rather example method 200 illustrates functional information to design/fabricate circuits, generate machine-readable instructions, or use a combination of hardware and machine-readable instructions to perform the illustrated processes.

At 202, a scanner module may be enabled to scan a document to be sent to a recipient. At 204, electronic raw data representing the document may be stored. In an example, the electronic raw data may be stored in an internal memory of the scanner module or an external storage connected to the scanner module.

At 206, an email address of the recipient may be received. At 208, a first user profile and a second user profile associated with the email address may be retrieved. In an example, the first and second user profiles may include first and second setting information, respectively. At 210, the electronic raw data may be processed in accordance with the first user profile to generate a scan image. In an example, the first user profile may be selected based on a priority. For example, the priority may be a predefined priority (e.g., as defined by a recipient), the priority may be determined based on a usage pattern of the recipient (e.g., a manner in which the recipient use the profiles for a scanning feature), or the like.

At 212, a first email including the scan image and an option to select the second user profile may be sent to the email address. In an example, the first email may include the scan image as an attachment and an electronic form including the option to select the second user profile in an email body. Further, a reply email including a selection of the second user profile may be received. Upon receiving the selection, second setting information associated with the second user profile may be retrieved and the electronic raw data may be processed in accordance with the second user profile to generate a modified scan image. Further, a second email including the modified scan image may be sent to the email address.

Furthermore, example method 200 may include a process to provide an option to create the first user profile and the second user profile prior to processing the electronic raw data. Further, the first user profile and the second user profile may be mapped to the email address using an authentication mechanism. Furthermore, the mapped user profile may be stored in a database (e.g., database 150 of FIG. 1B). In an example, the first user profile and the second user profile associated with the email address may be retrieved from the database in response to receiving a scan-to-email function. Example method 200 described herein can be implemented as part of an image forming apparatus that includes the scanner module or as part of a server that is connected to the scanner module.

Figure 3A:
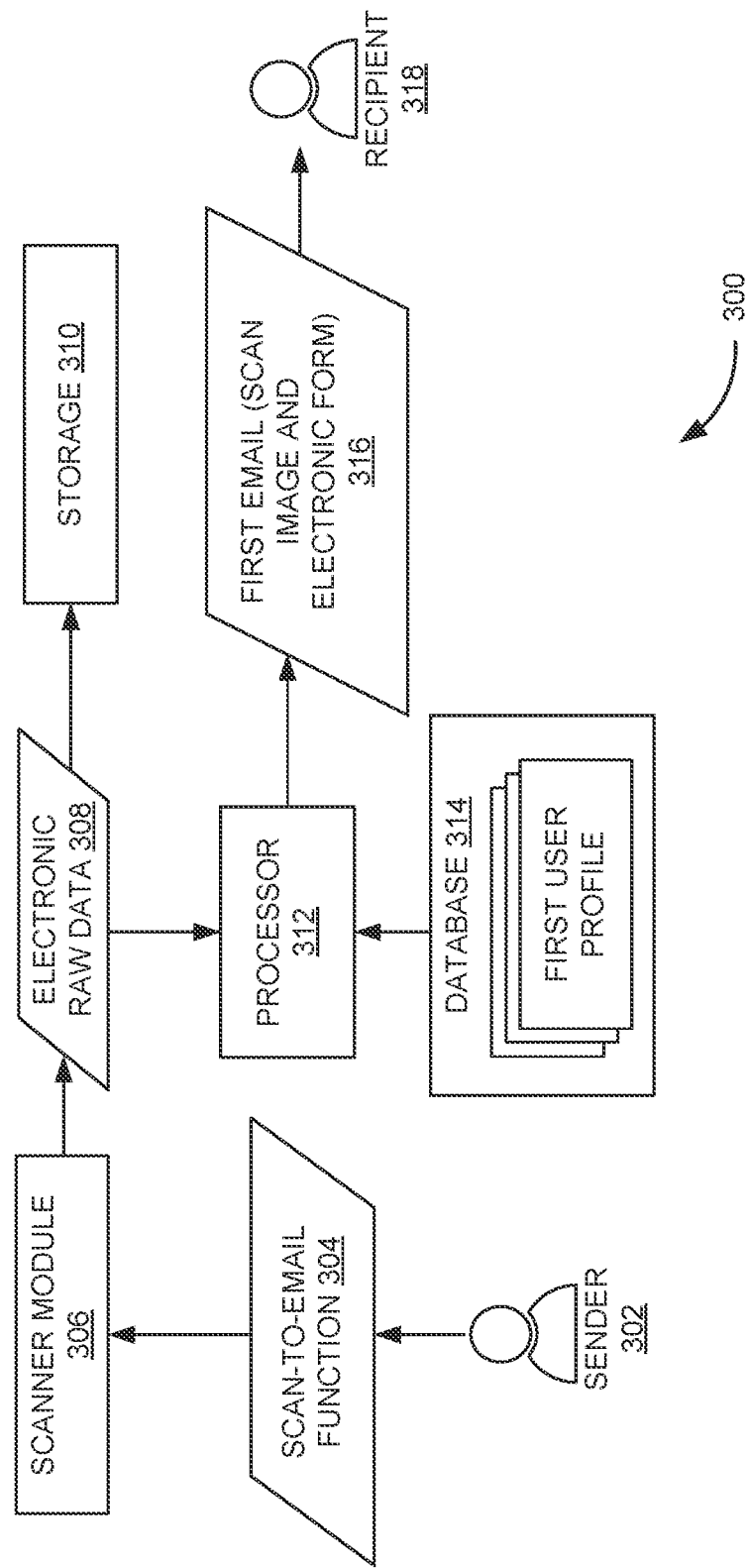
FIG. 3A is a functional block diagram of an example system, including a processor to transmit a first email including a scan image and an option to select a second user profile.

FIG. 3A is a functional block diagram of an example system 300, including a processor 312 to transmit a first email 316 including a scan image and an option to select a second user profile. A sender 302 may provide a document to a scanner module 306 and select a user-selectable scanning feature (e.g., a scan-to-email function 304). Upon receiving the selection, scanner module 306 may scan the document to generate electronic raw data 308. Further, electronic raw data 308 may be stored in a storage 310 using an identifier. For example, when the user-selectable scanning feature is scan-to-email function 304, electronic raw data 308 may be mapped to an email address of a recipient 318. In this example, electronic raw data 308 may be stored as a key-value pair (e.g., a key may represent an email address and value may represent electronic raw data 308).

Further, processor 312 may retrieve a first user profile and a second user profile associated with the email address from a database 314. For example, the first and second user profiles may include first and second setting information, respectively. Furthermore, processor 312 may process electronic raw data 308 in accordance with the first user profile to generate a scan image. In one example, the first user profile may be selected based on a priority. Further, processor 312 may send a first email 316 to the email address of recipient 318. Example first email 316 may include the scan image and an electronic form to provide an option to select the second user profile to modify the setting information of the scan image.

Figure 3B:
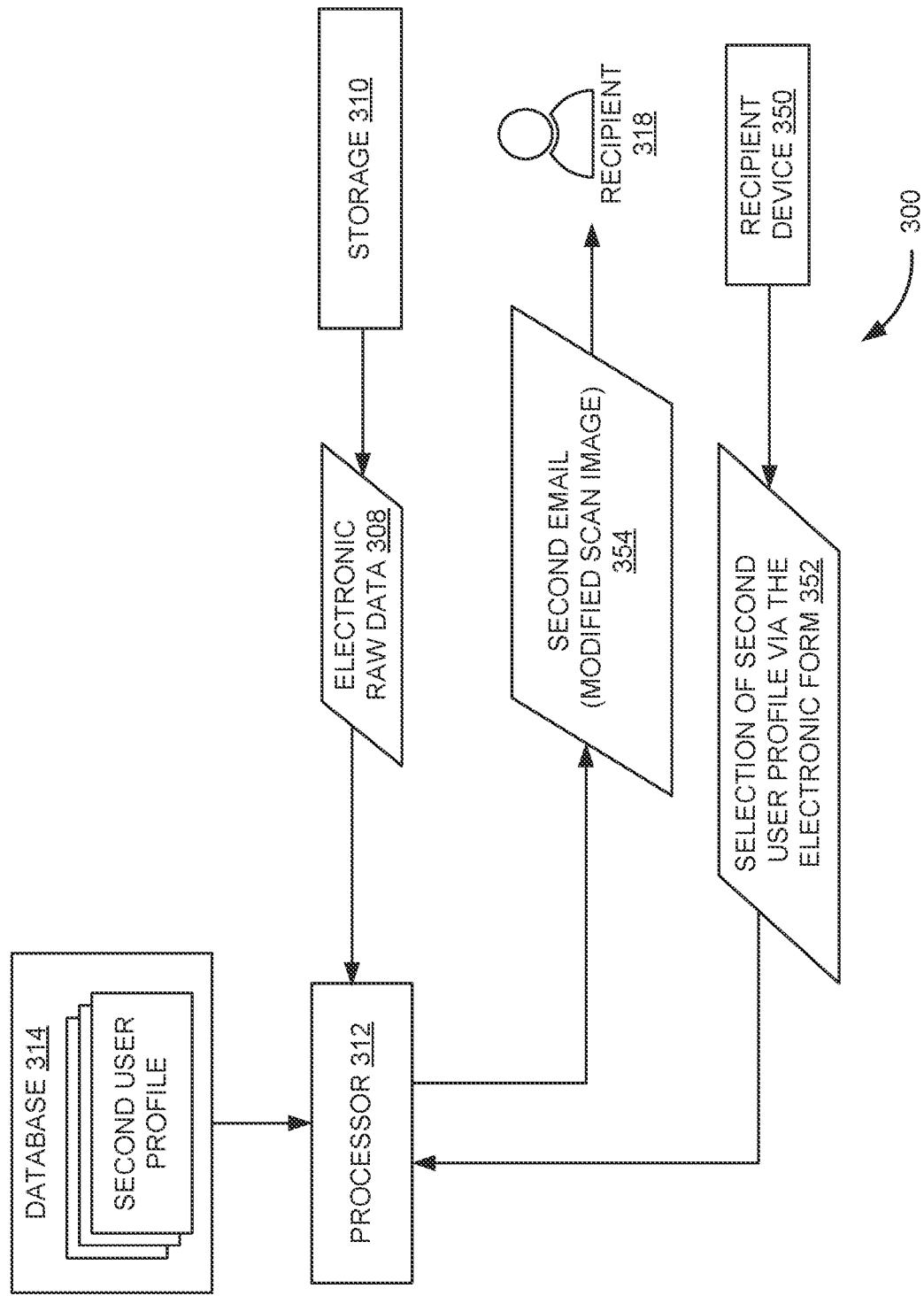
FIG. 3B is a functional block diagram of the example system of FIG. 3A, including the processor to transmit a second email including a modified scan image generated in accordance with the selected second user profile.

FIG. 3B is a functional block diagram of example system 300 of FIG. 3A, including processor 312 to transmit a second email 354 including a modified scan image generated in accordance with the selected second user profile. Similarly named elements of FIG. 3B may be similar in function and/or structure to elements described in FIG. 3A. In an example, recipient 318 may use recipient device 350 to select another user profile via the electronic form. For example, recipient 318 may select a second user profile and send the selection to processor 312 via the electronic form (e.g., as shown in 352).

Further, the selection of the second user profile (e.g., 352) may be received by processor 312 along with the identifier. Upon receiving the selection of the second user profile (e.g., 352), processor 312 may retrieve setting information associated with the second user profile from database 314 and retrieve electronic raw data 308 corresponding to the identifier from storage 310. Further, processor 312 may process retrieved electronic raw data 308 in accordance with the second user profile to generate a modified scan image and send a second email including the modified scan image (e.g., 354) to recipient 318.

FIG. 4 is an example email 400, including an electronic form 410 providing user profiles (e.g., 412 and 414) to modify setting information of a scan image 406. In an example, a processor of an image forming apparatus or a server may process electronic raw data representing a document in accordance with a first user profile to generate scan image 406. Further, the processor may send example email 400 (via an email account of the image forming apparatus (e.g., 404)) including scan image 406 to a recipients address (e.g., an email address of the recipient (e.g., 402). For example, email 400 may indicate that the scan image is generated in accordance with a first user profile (e.g., as shown in 408).

Further, example email 400 may include an electronic form 410 depicting available user profiles. As shown in FIG. 4, there are two available user profiles (e.g., 412 and 414) associated with the recipient with different setting information. For example, a second user profile 412 may include a type 'color' and resolution '600' DPI. A third user profile 414 may include a type 'black/while' and resolution '1200' DPI. Other example setting information may include resolution (e.g., '100', '200', '300', '600', '1200', and '2400' DPI), rotation angle (e.g., '0', '90', '180', and '270'), attribute X (e.g., 'VX1', 'VX2', and 'VX3'), attribute Y (e.g., 'VY1', VY2', and 'VY3'), or the like. Furthermore, upon selecting one of the user profiles (e.g., 412 or 414), the selected user profile may be sent to the processor using a 'submit' 416 option. Upon receiving the selected user profile, the processor may process electronic raw data in accordance with the selected user profile.

Figure 5A:
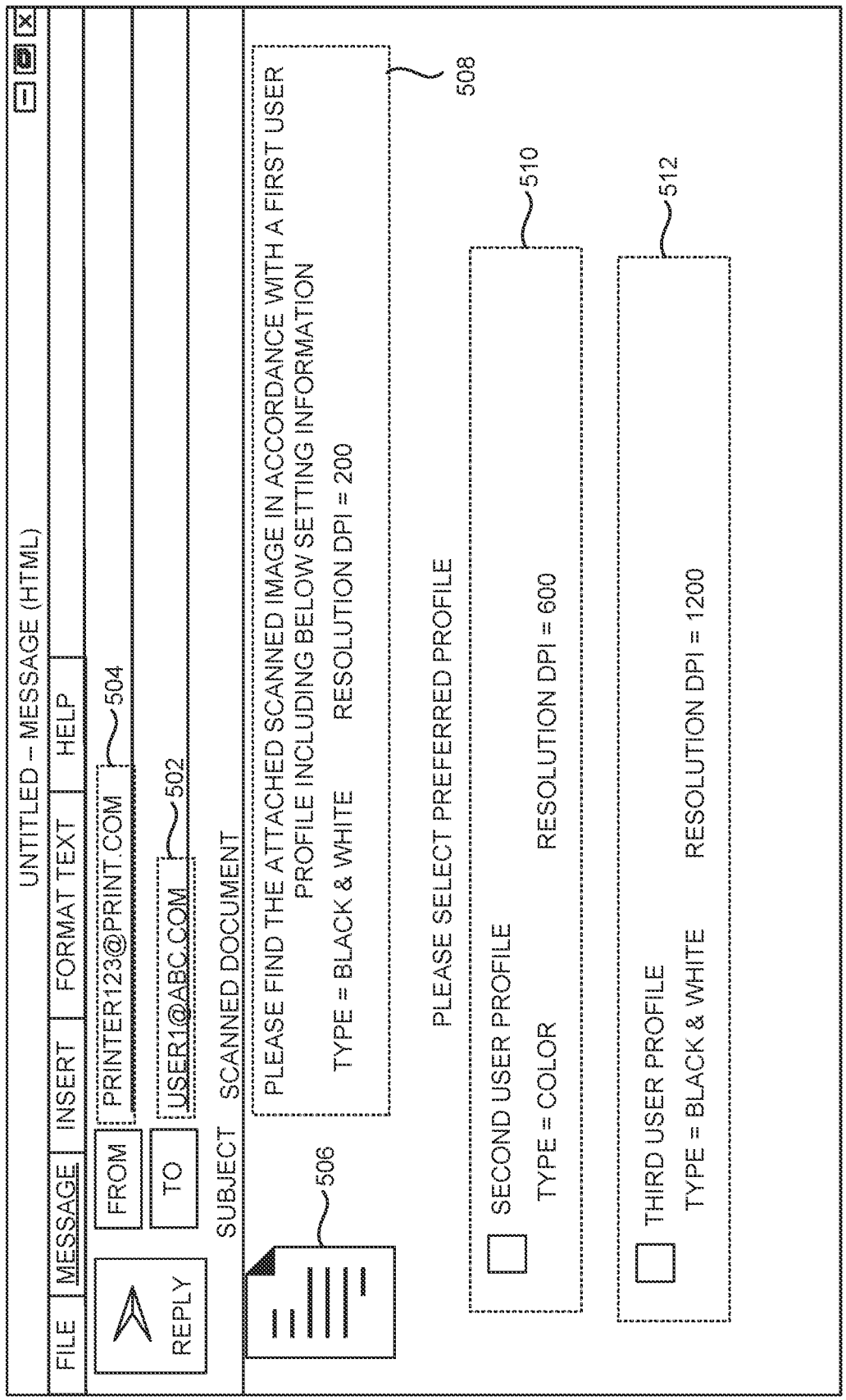
FIG. 5A is an example email, depicting available user profiles in an email body to modify setting information of a scan image.

FIG. 5A is an example email 500A, depicting available user profiles (e.g., 510 and 512) in an email body to modify setting information of a scan image 506. In an example, a processor of an image forming apparatus may process electronic raw data representing a document in accordance with a first user profile to generate scan image 506. As shown in the FIG. 5A, the image forming apparatus may transmit email 500A including scan image 506 via an email address 504 associated with the image forming apparatus to a recipient (e.g., to an email address 502). Example email 500A may indicate that a scan image 506 is processed in accordance with a first user profile (e.g., 508). Further, email 500A may depict available profiles (e.g., 510 and 512) to modify setting information of scan image 506. Furthermore, the recipient may select one of the profiles (e.g., second user profile 510 and third user profile 512) and transmit the selected user profile to an email address 504 of the image forming apparatus by replying to email 500A, as depicted in FIG. 5B.

Figure 5B:
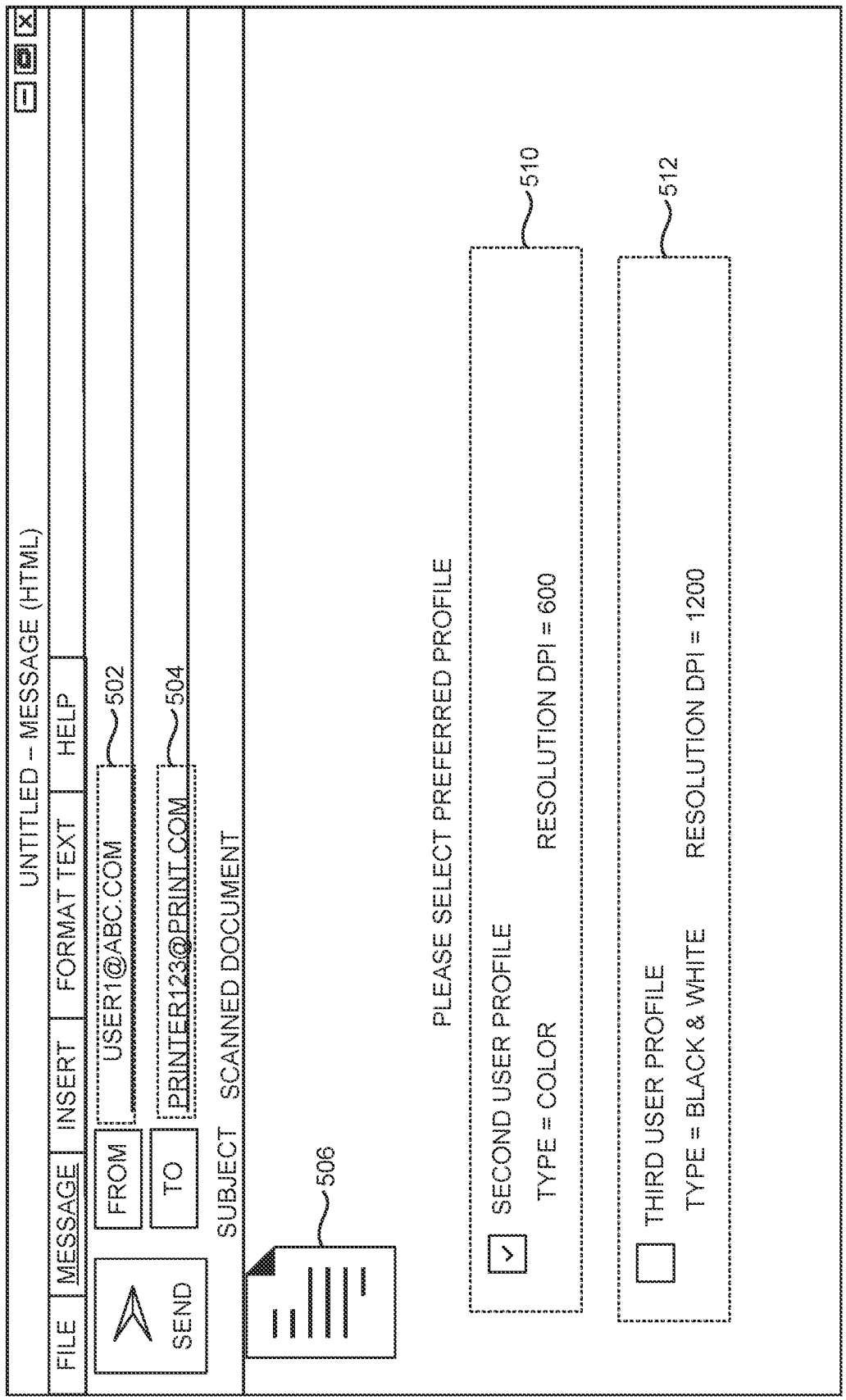
FIG. 5B is an example reply email to the email of FIG. 5A, depicting a selected user profile to modify the setting information of the scan image.

FIG. 5B is an example reply email 500B to email 500A of FIG. 5A, depicting a selected user profile (e.g., 510) to modify the setting information of scan image 506. Similarly named elements of FIG. 5B may be similar in function and/or structure to elements described in FIG. 5A. As shown in FIG. 5B, the recipient may select preferred user profile (e.g., as shown in 510) from the available user profiles (e.g., first user profile 510 and second user profile 512). Furthermore, the recipient may send reply email 500B with the selected preferred user profile to email address 504 of the image forming apparatus.

Figure 6:
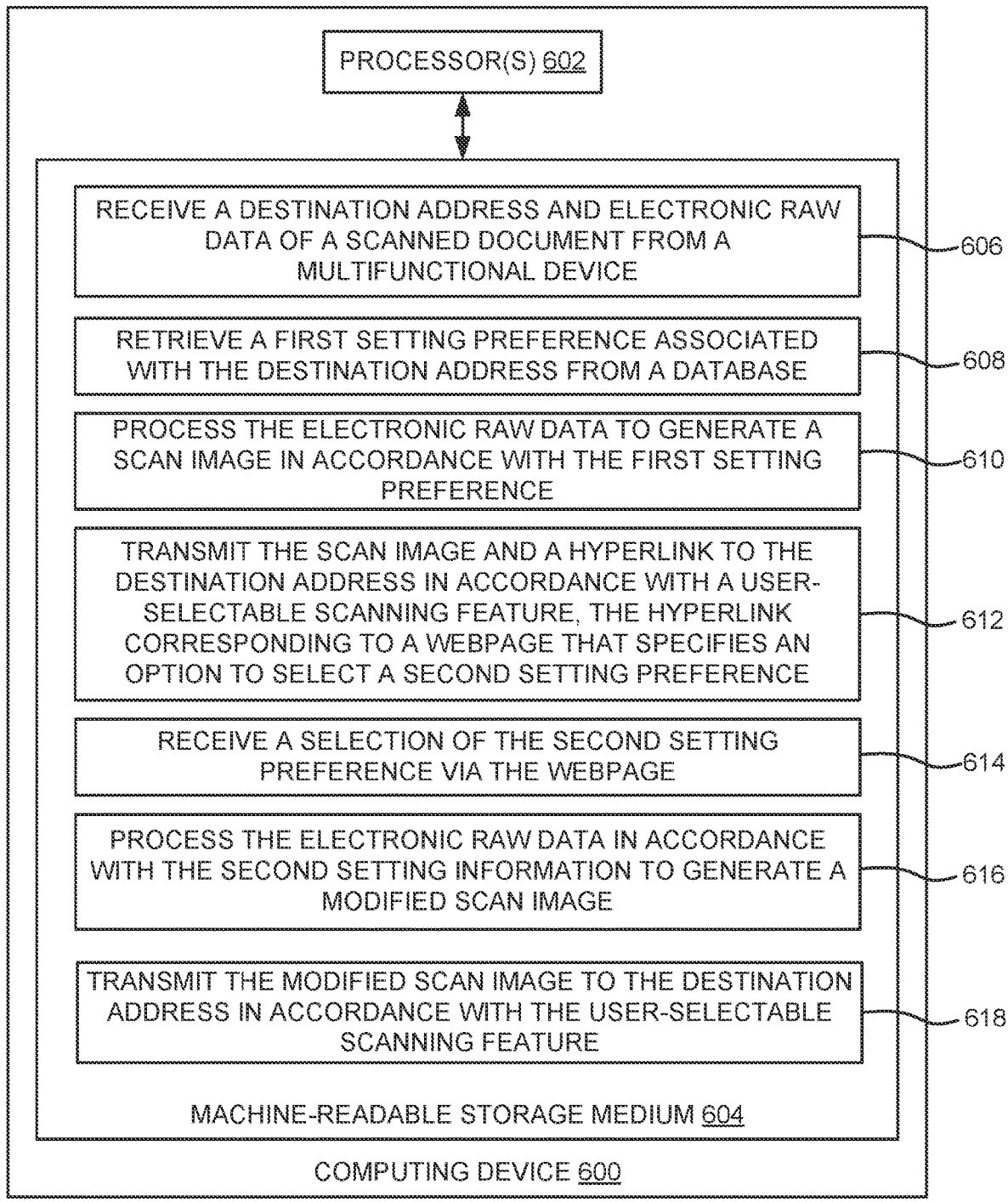
FIG. 6 is a block diagram of an example computing device including non-transitory machine-readable storage medium storing instructions to generate a modified scan image in accordance with a selected second setting preference.

FIG. 6 is a block diagram of an example computing device 600 including non-transitory machine-readable storage medium 604 storing instructions (e.g., 606 to 618) to generate a modified scan image in accordance with a selected second setting preference. Computing device 600 may include a processor 602 and machine-readable storage medium 604 communicatively coupled through a system bus. Processor 602 may be any type of central processing unit (CPU), microprocessor, or processing logic that interprets and executes machine-readable instructions stored in machine-readable storage medium 604.

Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 604 may be non-transitory machine-readable medium. Machine-readable storage medium 604 may be remote but accessible to computing device 600.

As shown in FIG. 6, machine-readable storage medium 604 may store instructions 606-618. In an example, instructions 606-618 may be executed by processor 602 to generate a modified scan image in accordance with a selected second setting preference. In some examples, machine-readable storage medium 604 may store instructions to enable a user to create a first setting preference and a second setting preference to generate a scan image. Further, machine-readable storage medium 604 may store instructions to map the first setting preference and the second setting preference to a destination address according to a priority. Furthermore, machine-readable storage medium 604 may store instructions to store the mapped first setting preference and the second setting preference.

Instructions 606 may be executed by processor 602 to receive the destination address and electronic raw data of a scanned document from a multifunctional device. Instructions 608 may be executed by processor 602 to retrieve the first setting preference associated with the destination address from a database. Instructions 610 may be executed by processor 602 to process the electronic raw data to generate a scan image in accordance with the first setting preference.

Instructions 612 may be executed by processor 602 to transmit the scan image and a hyperlink to the destination address in accordance with a user-selectable scanning feature, Example hyperlink may correspond to a webpage that specifies an option to select the second setting preference. In an example, instructions to transmit the scan image and the hyperlink to the destination address may include instructions to transmit an email including the scan image and the hyperlink to the destination address when the user-selectable scanning feature is a scan-to-email function. For example, the scan image may be included as an attachment in the email and the hyperlink may be included in a body of the email. In another example, instructions to transmit the scan image and the hyperlink to the destination address may include instructions to transmit the image and the hyperlink to a destination device associated with the destination address when the user-selectable feature is a scan-to-fax function. Example destination device may print the scan image on a first print medium and the hyperlink on a second print medium.

Prior to transmitting the scan image and the hyperlink, machine-readable storage medium 604 may include instructions to:

store the received electronic raw data of the scanned document using an identifier, generate, at a web server that is communicatively coupled to computing device 600, the webpage including the first setting preference, the option to select the second setting preference, and the identifier, and associate the hyperlink to the webpage. In an example, the webpage may be displayed in a web browser upon activating the hyperlink.

Instructions 614 may be executed by processor 602 to receive a selection of the second setting preference via the webpage. Instructions 616 may be executed by processor 602 to process the electronic raw data in accordance with the second setting information to generate a modified scan image. In an example, instructions to process the electronic raw data in accordance with the second setting information may include instructions to:

receive the selection of the second setting preference and the identifier via the webpage, retrieve the electronic raw data corresponding to the identifier, and process the retrieved electronic raw data in accordance with the second setting preference to generate the modified image.

Further, instructions 618 may be executed by processor 602 to transmit the modified scan image to the destination address in accordance with the user-selectable scanning feature.

Figure 7A:
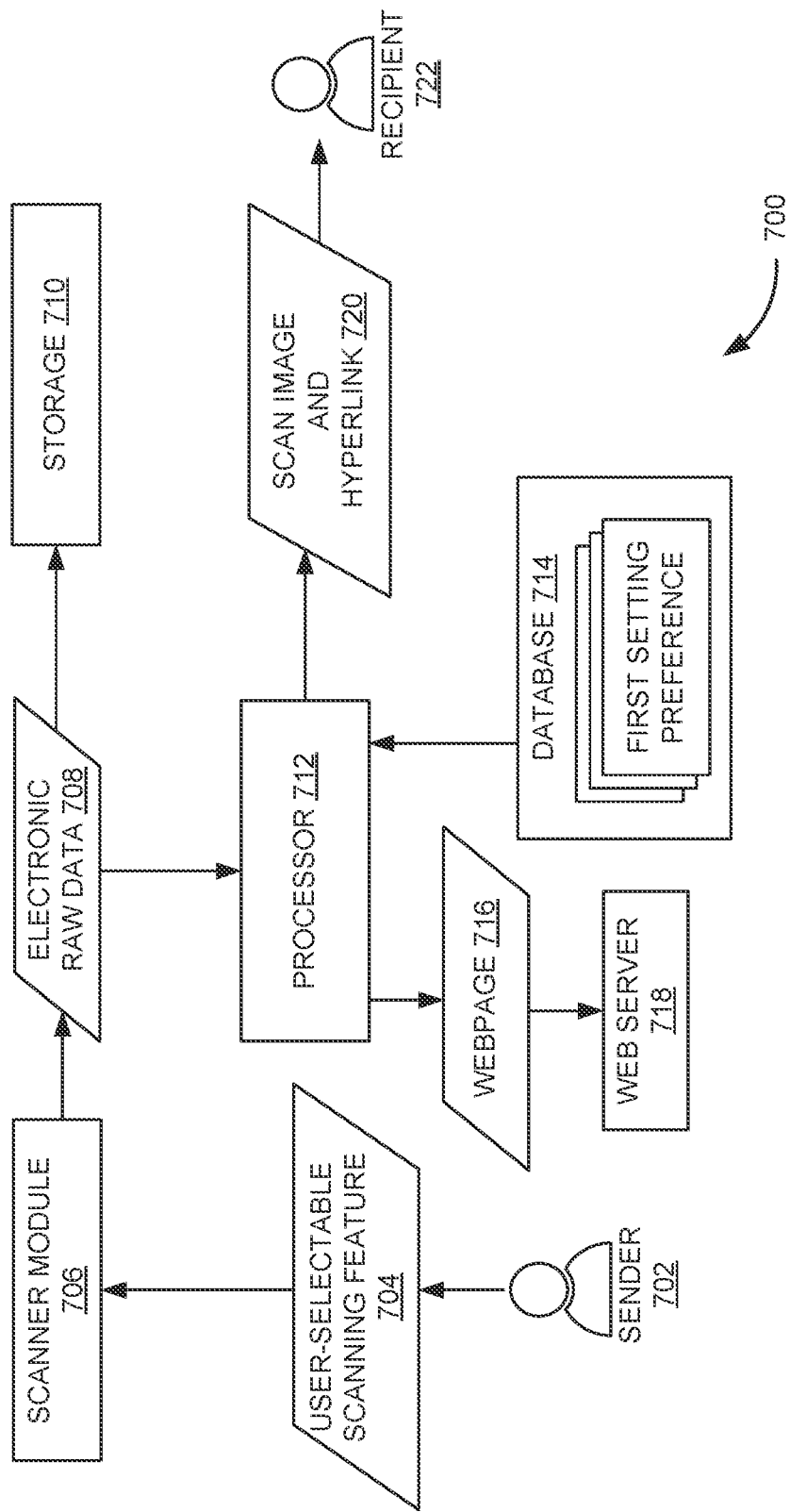
FIG. 7A is a functional block diagram of an example system, including a processor to generate a scan image based on a first setting preference and a corresponding webpage.

FIG. 7A is a functional block diagram of an example system 700, including a processor 712 to generate a scan image (e.g., 720) based on a first setting preference and a corresponding webpage 716. A sender 702 may provide a document to a scanner module 706 and select a user-selectable scanning feature 704. Example user-selectable scanning feature 704 may be a scan-to-email function or a scan-to-fax function.

Upon receiving the selection, scanner module 706 may scan the document to generate electronic raw data 708. Further, electronic raw data 708 may be stored in a storage 710 using an identifier. Furthermore, processor 712 may receive a destination address (e.g., an email address or a fax number). In an example, when user-selectable scanning feature 704 is the scan-to-email function, electronic raw data 708 may be mapped to an email message identifier. In this example, electronic raw data 708 may be stored as a key-value pair (e.g., a key may represent an email message identifier and value may represent electronic raw data 708).

Further, processor 712 may retrieve a first setting preference associated with the destination address from a database 714. Furthermore, processor 712 may process electronic raw data 708 to generate a scan image (e.g., 720) in accordance with the first setting preference. Further, processor 712 may generate webpage 716 in a web server 718. In an example, processor 712 may transmit a hyperlink corresponding to webpage 716 along with the scan image (e.g., as shown in 720) to a recipient 722 in accordance with user-selectable scanning feature 704.

Figure 7B:
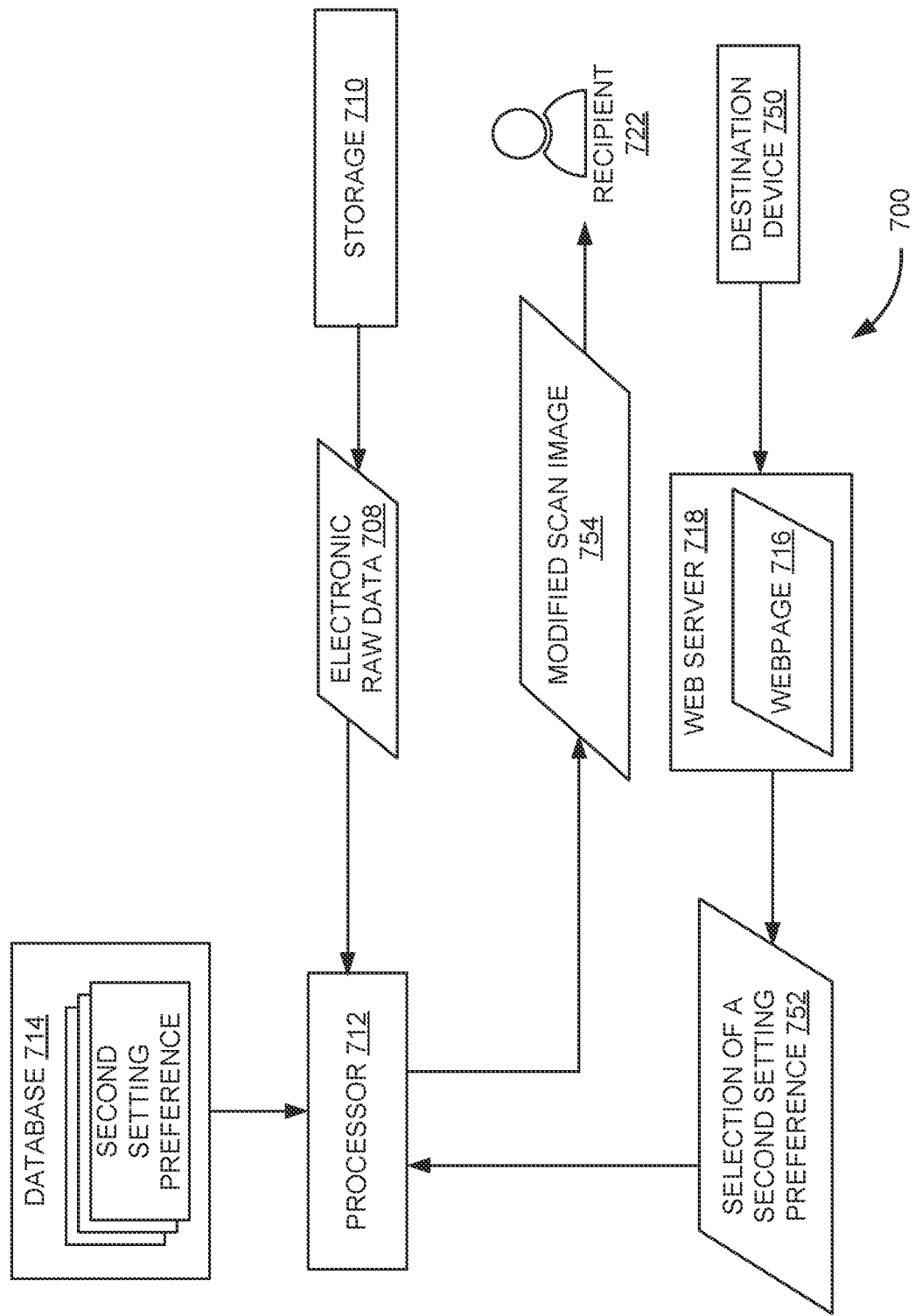
FIG. 7B is a functional block diagram of the example system of FIG. 7A, including the processor to generate a modified scan image based on a second setting preference received via the webpage.
Figure 8:
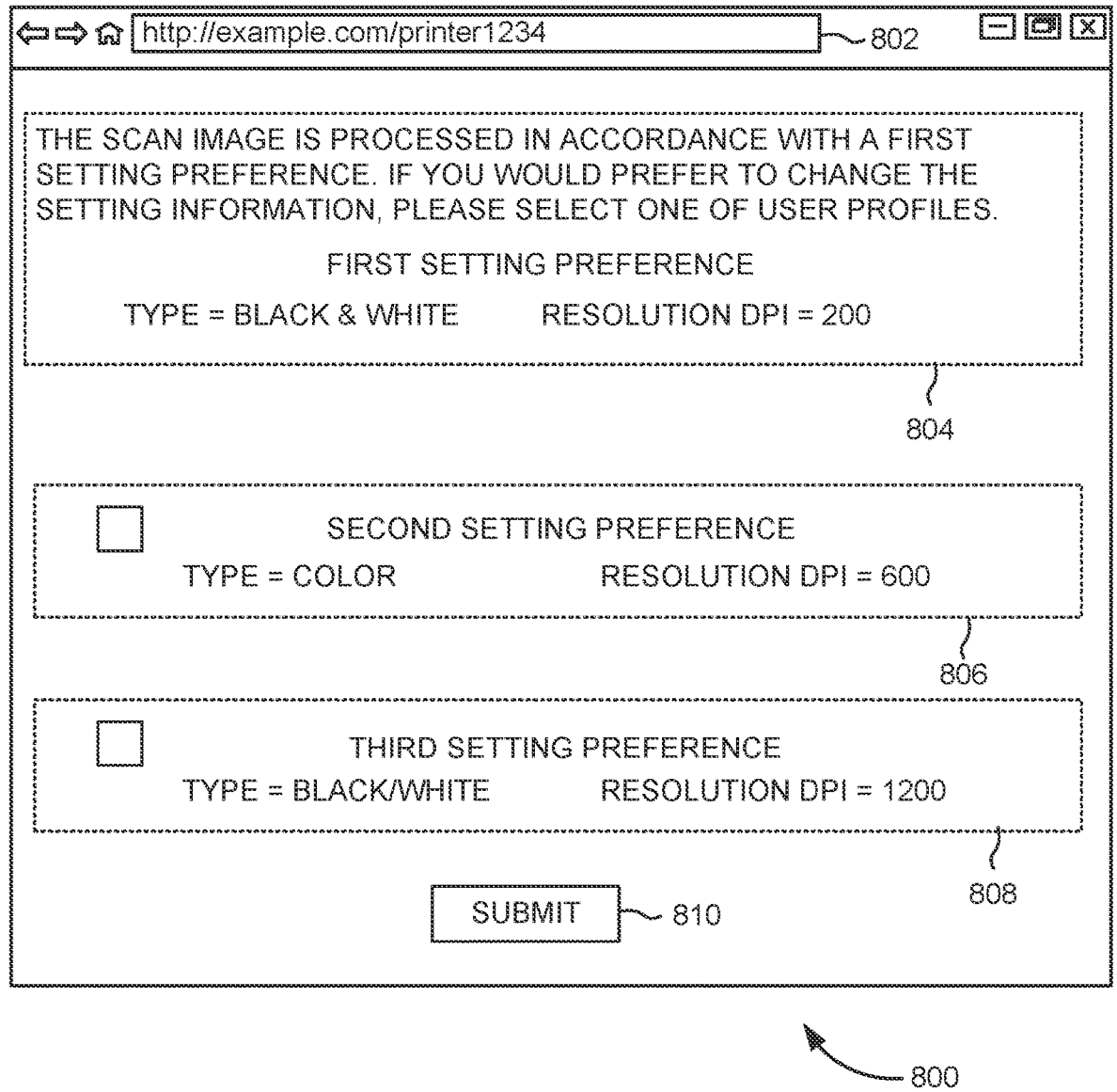
FIG. 8 illustrates an example webpage, depicting setting information of a scan image and available setting preferences to modify the setting information of the scan image.

FIG. 7B is a functional block diagram of example system 700 of FIG. 7A, including processor 712 to generate a modified scan image 754 based on a second setting preference received via webpage 716. Similarly named elements of FIG. 7B may be similar in function and/or structure to elements described in FIG. 7A. In an example, recipient 722 may use destination device 750 (e.g., computer, smartphone, or the like) to select another setting preference via webpage 716. Further, web server 718 may submit a selection of a second setting preference (e.g., 752) to processor 712 using the identifier. For example, when user-selectable scanning feature 704 (e.g., as shown in FIG. 7A) is the scan-to-email function, recipient 722 may receive an email with scan image as an attachment and the hyperlink in a body of the email. Further, upon activating the hyperlink, recipient 722 may access the first setting preference via webpage 716. In webpage 716, recipient 722 can select the second setting preference and click on a "submit" option.

Further, the second setting preference selected in webpage 716 may be received by processor 712 along with the identifier. Upon receiving the second setting preference, processor 712 may retrieve setting information associated with the second setting preference from database 714 and may retrieve electronic raw data 708 corresponding to the identifier from storage 710.

In an example, processor 712 may fetch electronic raw data 708 using the identifier. Further, processor 712 may process retrieved electronic raw data 708 in accordance with the second setting preference to generate modified scan image 754, which may be transmitted to recipient 722 in accordance with user-selectable scanning feature 704.

In another example, when user-selectable scanning feature 704 is the scan-to-fax function, processor 712 may transmit the scan image to destination device 750 (e.g., a fax machine) to print the scan image on a first print medium and the hyperlink on a second print medium. In such instances, recipient 722 may open webpage 716 using a user device (e.g., a computing device) by entering the hyperlink in a web browser and select the second setting preference in webpage 716.

Fla 8 illustrates example webpage 800, depicting setting information of a scan image and available setting preferences (e.g., 806 and 808) to modify the setting information of the scan image. In an example, webpage 800 may be displayed in a web browser of a destination device associated with a recipient upon activating a hyperlink 802. Example webpage 800 may include a first setting preference which is used to output a scan image (e.g., as shown in 804).

As shown in Fla 8, there are two available setting preferences (e.g., 806 and 808) associated with the recipient with different setting information. Furthermore, upon selecting another setting preference using available options (e.g., 806 and 808), the recipient may submit the selected setting preference using a 'submit' 810 option. Upon submitting, another setting preference may be transmitted to the image forming apparatus via a web server. In an example, the selected setting preference may be transmitted to a printer address (e.g., an email ID of the image forming apparatus) mapped to webpage 800. In other examples, webpage 800 may also include an identifier that maps the stored electronic raw data to the webpage 800 such that the image forming apparatus can retrieve the electronic raw data using the identifier.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on," Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. An image forming apparatus comprising:
   a scanner module to:
      scan a document to be sent to a recipient; and
      store electronic raw data representing the document; and
   a controller connected to the scanner module to:
      receive a destination address of the recipient as an input to perform a user-selectable scanning feature; and
      retrieve a first user profile and a second user profile associated with the destination address from a database, the first user profile and the second user profile comprising first setting information and second setting information, respectively;
      process the electronic raw data to generate a scan image in accordance with the first user profile, the first user profile is selected based on a characteristic of the electronic raw data; and
      transmit the scan image to the destination address in accordance with the user-selectable scanning feature.

2. The image forming apparatus of claim 1, wherein the controller is to:
   transmit an email including the scan image as an attachment to the destination address when the user-selectable scanning feature is a scan-to-email function.

3. The image forming apparatus of claim 1, wherein the controller is to:
   transmit the scan image to a destination device associated with the destination address when the user-selectable scanning feature is a scan-to-fax function, wherein the destination device is to print the scan image on a first print medium.

4. The image forming apparatus of claim 1, wherein the scanner module is to store the electronic raw data in an internal memory of the image forming apparatus or an external storage connected to the image forming apparatus, and wherein the stored electronic raw data is mapped to the destination address using an identifier.

5. The image forming apparatus of claim 1, wherein the destination address is an email address or a fax number.

6. A method comprising:
   enabling a scanner module to scan a document to be sent to a recipient;
   storing electronic raw data representing the document;
   receiving an email address of the recipient;
   retrieving a first user profile and a second user profile associated with the email address, the first and second user profiles comprising first and second setting information, respectively;
   processing the electronic raw data in accordance with the first user profile to generate a scan image, the first user profile being selected based on a priority; and
   sending a first email, including the scan image and an option to select the second user profile, to the email address.

7. The method of claim 6, further comprising:
   receiving a reply email including a selection of the second user profile;
   upon receiving the selection, processing the electronic raw data in accordance with the second user profile to generate a modified scan image; and
   sending a second email including the modified scan image to the email address.

8. The method of claim 7, wherein sending the first email including the scan image and the option comprises:
   sending the first email including the scan image as an attachment and an electronic form including the option to select the second user profile in an email body.

9. The method of claim 6, further comprising:
   providing an option to create the first user profile and the second user profile;
   mapping the first user profile and the second user profile to the email address using an authentication mechanism; and
   storing the mapped user profile in a database, wherein the first user profile and the second user profile associated with the email address are retrieved from the database in response to receiving a scan-to-email function.

10. A non-transitory computer-readable storage medium encoded with instructions that, when executed by a processor of a computing device, cause the processor to:
    receive a destination address and electronic raw data of a scanned document from a multifunctional device;
    retrieve a first setting preference associated with the destination address from a database;
    process the electronic raw data to generate a scan image in accordance with the first setting preference;
    transmit the scan image and a hyperlink to the destination address in accordance with a user-selectable scanning feature, the hyperlink corresponding to a webpage that specifies an option to select a second setting preference;
    receive a selection of the second setting preference via the webpage;
    process the electronic raw data in accordance with the second setting preference to generate a modified scan image; and
    transmit the modified scan image to the destination address in accordance with the user-selectable scanning feature.

11. The non-transitory computer-readable storage medium of claim 10, wherein instructions to transmit the scan image and the hyperlink to the destination address comprise instructions to:
    transmit an email including the scan image and the hyperlink to the destination address when the user-selectable scanning feature is a scan-to-email function, wherein the scan image is included as an attachment in the email and the hyperlink is included in a body of the email.

12. The non-transitory computer-readable storage medium of claim 10, wherein instructions to transmit the scan image and the hyperlink to the destination address comprise instructions to:
    transmit the image and the hyperlink to a destination device associated with the destination address when the user-selectable feature is a scan-to-fax function, wherein the destination device is to print the scan image on a first print medium and the hyperlink on a second print medium.

13. The non-transitory computer-readable storage medium of claim 10, further comprising instructions to:
    prior to transmitting the scan image and the hyperlink:
        store the received electronic raw data of the scanned document using an identifier;

generate, at a web server that is communicatively coupled to the computing device, the webpage including the first setting preference, the option to select the second setting preference, and the identifier; and associate the hyperlink to the webpage, wherein the webpage is to be displayed in a web browser upon activating the hyperlink.

14. The non-transitory computer-readable storage medium of claim 13, wherein instructions to process the electronic raw data in accordance with the second setting information comprise instructions to:

receive the selection of the second setting preference and the identifier via the webpage;

retrieve the electronic raw data corresponding to the identifier; and process the retrieved electronic raw data in accordance with the second setting preference to generate the modified image.

15. The non-transitory computer-readable storage medium of Tim 10, further comprising instructions to:

enable a user to create the first setting preference and the second setting preference to generate the scan image;

map the first setting preference and the second setting preference to the destination address according to a priority; and store the mapped first setting preference and the second setting preference.

* * * * *